(12) United States Patent
Ogata et al.

(10) Patent No.: US 12,715,314 B2
(45) Date of Patent: Aug. 25, 2026

(54) CONSTRUCTION MACHINE

(71) Applicant: Hitachi Construction Machinery Co., Ltd., Tokyo (JP)

(72) Inventors: Atsushi Ogata, Tsuchiura (JP); Takafumi Arakawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 19/105,996

(22) PCT Filed: Mar. 29, 2023

(86) PCT No.: PCT/JP2023/012733
§ 371 (c)(1),
(2) Date: Feb. 24, 2025

(87) PCT Pub. No.: WO2024/201765
PCT Pub. Date: Oct. 3, 2024

(65) Prior Publication Data
US 2026/0070434 A1 Mar. 12, 2026

(51) Int. Cl.
*B60L 50/70* (2019.01)
*B60K 1/00* (2006.01)
(Continued)

(52) U.S. Cl.
CPC ................ *B60L 50/70* (2019.02); *B60K 1/00* (2013.01); *B60L 3/04* (2013.01); *B60L 58/33* (2019.02);
(Continued)

(58) Field of Classification Search
CPC .. B60L 50/70; B60L 58/33; B60L 3/04; B60L 2200/40; B60K 1/00;
(Continued)

(56) References Cited

U.S. PATENT DOCUMENTS 6,290,594 B1 9/2001 Osborne
8,171,860 B1 5/2012 Miller et al.
(Continued)

FOREIGN PATENT DOCUMENTS

EP 4 119 379 A1 1/2023
JP 61-89741 U 6/1986
(Continued)

OTHER PUBLICATIONS

JP-5097020-B2 Machine English Translation (Year: 2012).*
(Continued)

*Primary Examiner* — Jason D Shanske
*Assistant Examiner* — Matthew James O'Neill
(74) *Attorney, Agent, or Firm* — Crowell & Moring LLP

(57) ABSTRACT

There is provided a construction machine including an electrically driven motor that serves as a power source, a heat exchanger, a fuel cell that generates power to be provided to the electrically driven motor, a cooling fan that blows cooling air to the heat exchanger, and a fan controller that controls rotation of the cooling fan. In the construction machine, a hydrogen gas detection sensor is provided in a machine room in which the heat exchanger, the fuel cell, and the cooling fan are disposed, and the fan controller raises a rotation speed of the cooling fan when the hydrogen gas detection sensor has detected a hydrogen gas.

7 Claims, 11 Drawing Sheets

(51) Int. Cl.

| | |
|---|---|
| ***B60L 3/04*** | (2006.01) |
| ***B60L 58/33*** | (2019.01) |
| ***E02F 3/32*** | (2006.01) |
| ***E02F 9/16*** | (2006.01) |
| ***E02F 9/20*** | (2006.01) |
| ***E02F 9/22*** | (2006.01) |
| ***E02F 9/24*** | (2006.01) |
| ***E02F 9/26*** | (2006.01) |

(52) U.S. Cl.
CPC .................. *E02F 3/32* (2013.01); *E02F 9/16* (2013.01); *E02F 9/2058* (2013.01); *E02F 9/226* (2013.01); *E02F 9/24* (2013.01); *E02F 9/261* (2013.01); *E02F 9/267* (2013.01); *B60K 2001/006* (2013.01); *B60L 2200/40* (2013.01)

(58) Field of Classification Search
CPC ........ B60K 2001/006; E02F 3/32; E02F 9/16; E02F 9/2058; E02F 9/226; E02F 9/24; E02F 9/261; E02F 9/267
See application file for complete search history.

(56) References Cited

U.S. PATENT DOCUMENTS

| | | | | |
|---|---|---|---|---|
| 2009/0317692 | A1 | 12/2009 | Matsumoto et al. | |
| 2013/0026954 | A1* | 1/2013 | Sulzer | H04L 27/2603 315/362 |
| 2013/0071212 | A1* | 3/2013 | Yunoue | E02F 9/0883 414/685 |
| 2018/0166731 | A1 | 6/2018 | Yu et al. | |
| 2023/0417016 | A1 | 12/2023 | Sekiguchi et al. | |

FOREIGN PATENT DOCUMENTS

| | | | | |
|---|---|---|---|---|
| JP | 2005-235635 | A | | 9/2005 |
| JP | 2007-80655 | A | | 3/2007 |
| JP | 2010-4649 | A | | 1/2010 |
| JP | 5097020 | B2 | * | 12/2012 |
| JP | 2013-29014 | A | | 2/2013 |
| JP | 2022-159622 | A | | 10/2022 |
| JP | 2022-180565 | A | | 12/2022 |
| KR | 10-2023-0021208 | A | | 2/2023 |
| KR | 10-2023-0024763 | A | | 2/2023 |

OTHER PUBLICATIONS

International Search Report (PCT/ISA/210) issued in PCT Application No. PCT/JP2023/012733 dated May 16, 2023 with English translation (5 pages).

Japanese-language Written Opinion (PCT/ISA/237) issued in PCT Application No. PCT/JP2023/012733 dated May 16, 2023 with English translation (7 pages).

Japanese-language International Preliminary Report on Patentability (PCT/IPEA/409) issued in PCT Application No. PCT/JP2023/012733 dated Nov. 18, 2024, including Annexes with partial English Translation (19 pages).

International Preliminary Report on Patentability (PCT/IB/338 & PCT/IPEA/409) issued in PCT Application No. PCT/JP2023/012733 dated Oct. 2, 2025 (4 pages).

Extended European Search Report issued in European Application No. 23930405.8 dated Apr. 20, 2026 (10 pages).

* cited by examiner

[FIG.1]
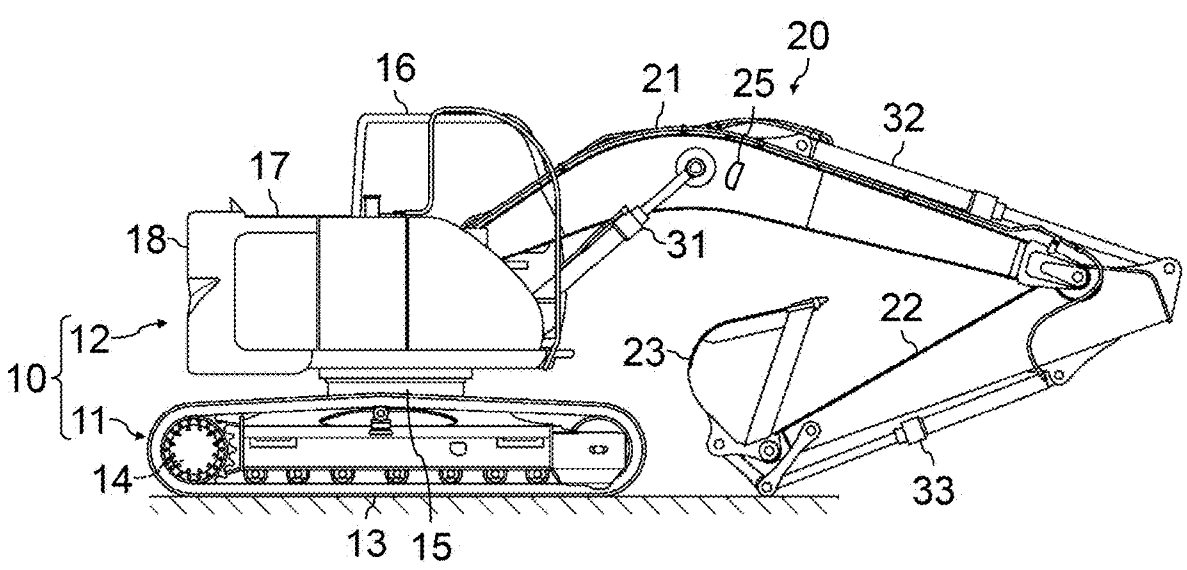

[FIG.2]
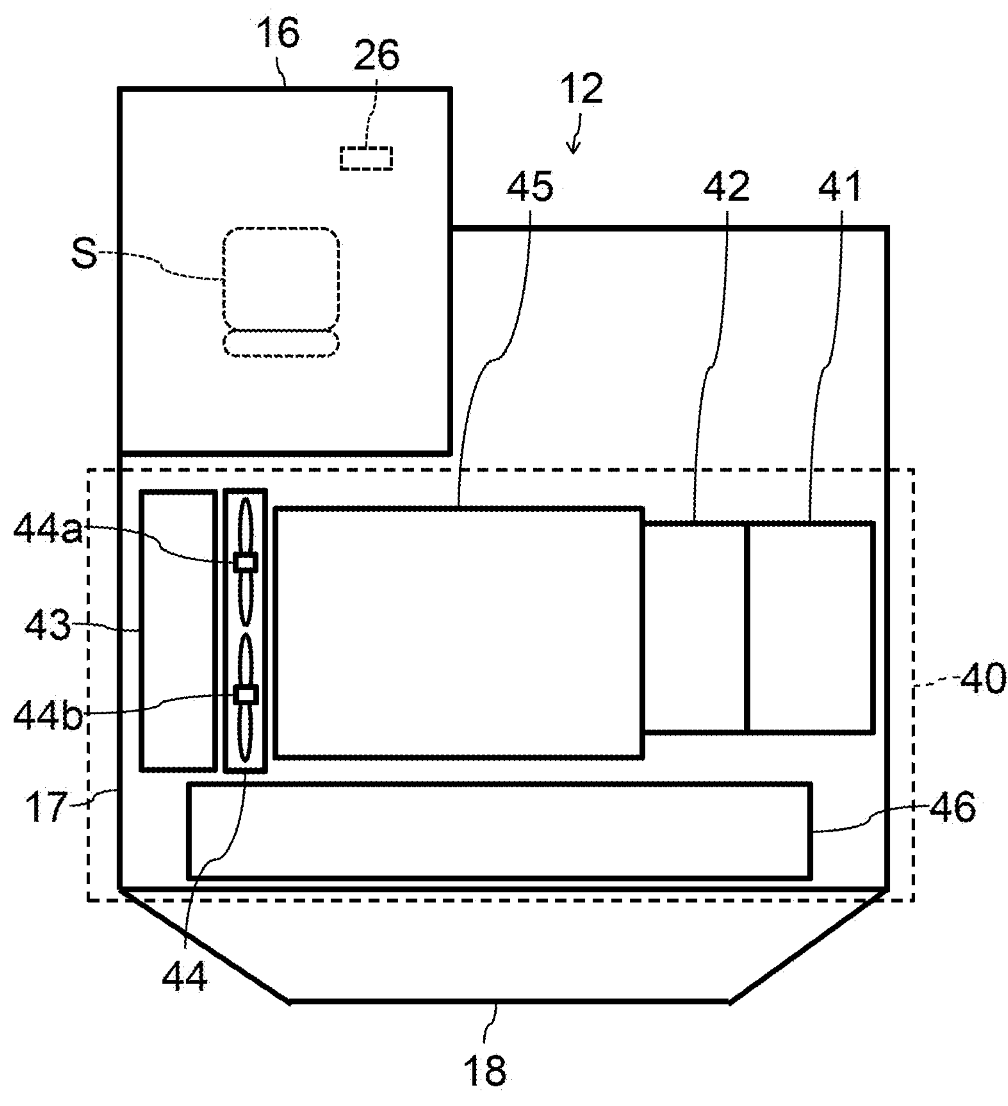

[FIG.3]
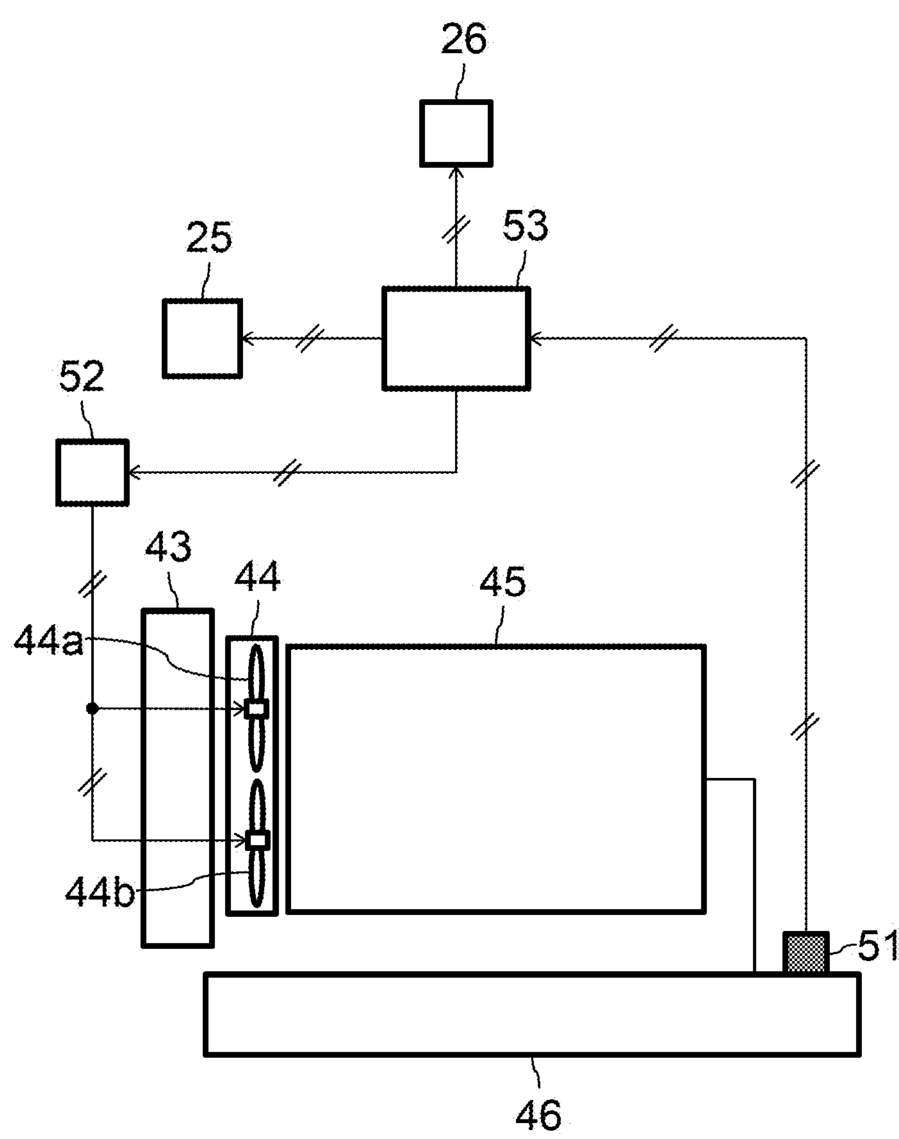

[FIG.4]
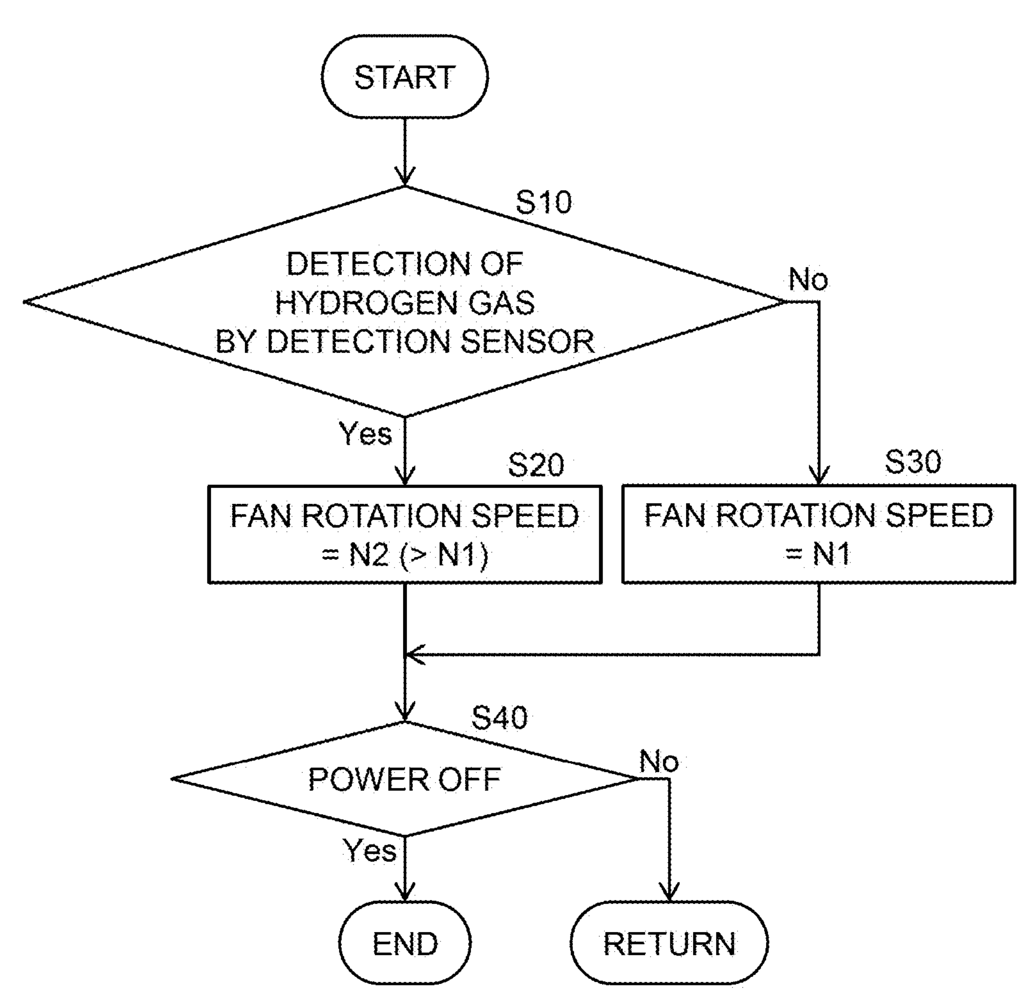

[FIG.5]
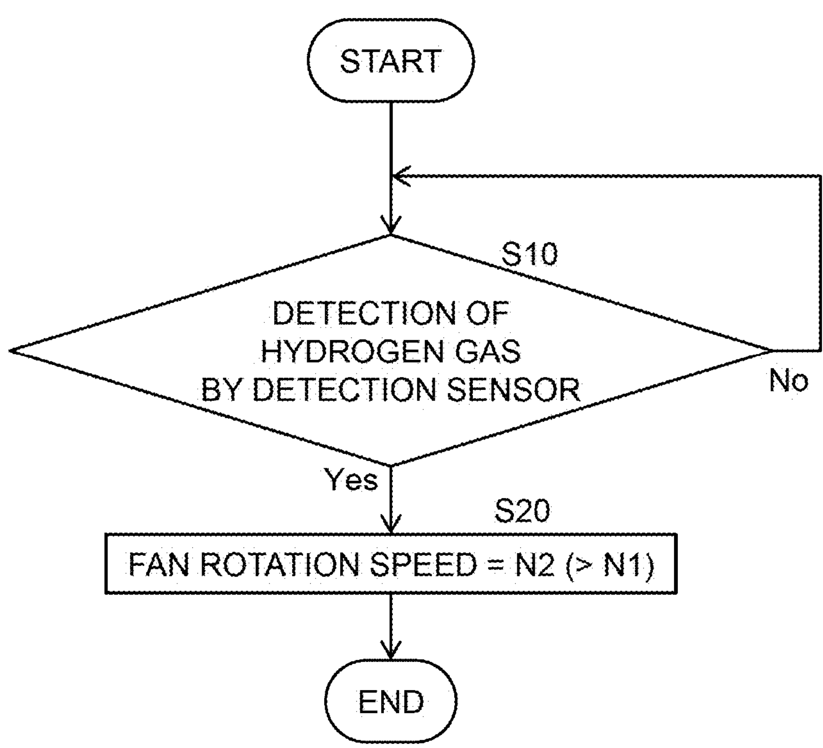

[FIG.6]
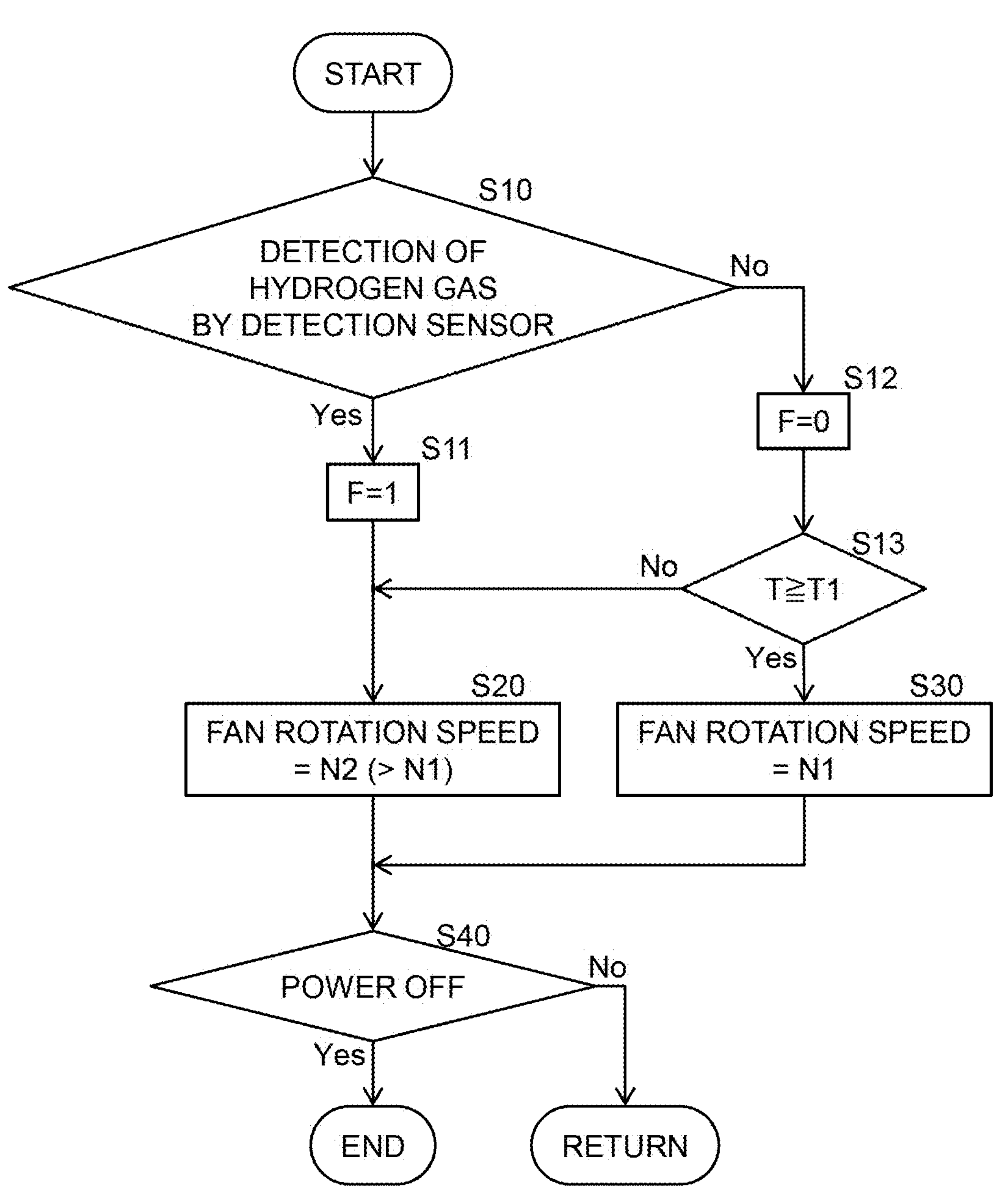

[FIG.7]
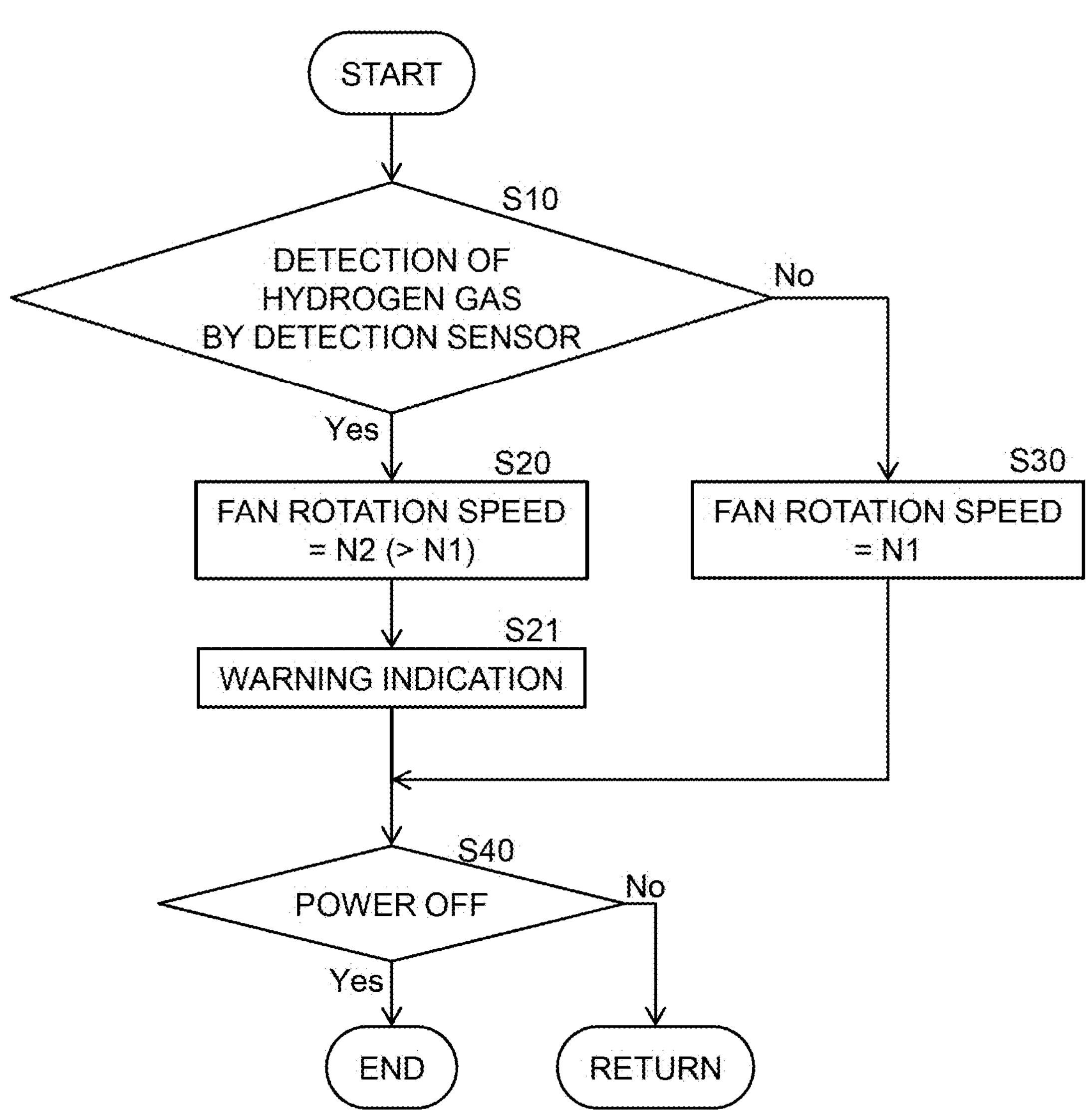

[FIG.8]

PLEASE GET OFF
IMMEDIATELY
AND
STAY AWAY FROM
EXCAVATOR

[FIG.9]
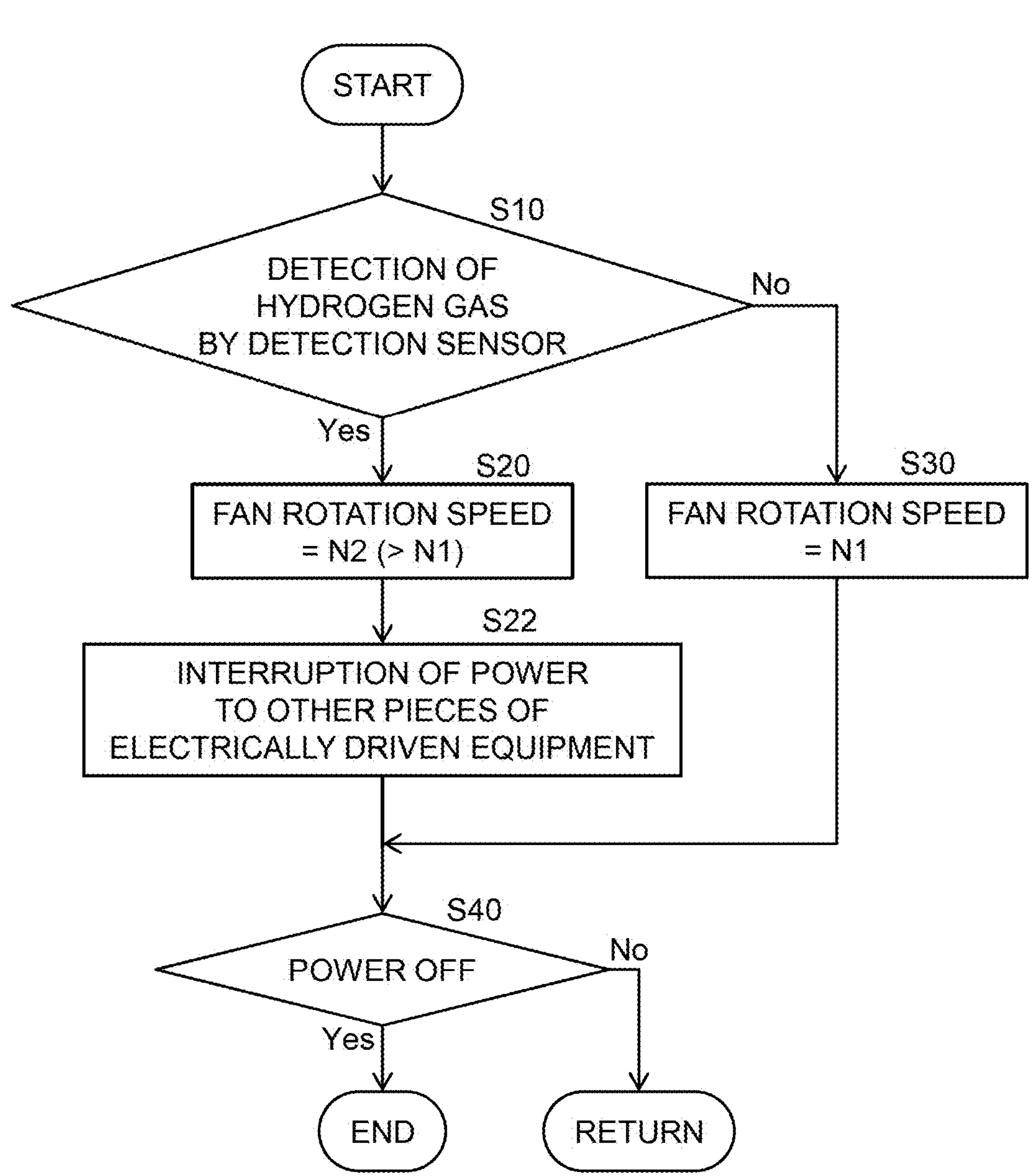

[FIG.10]
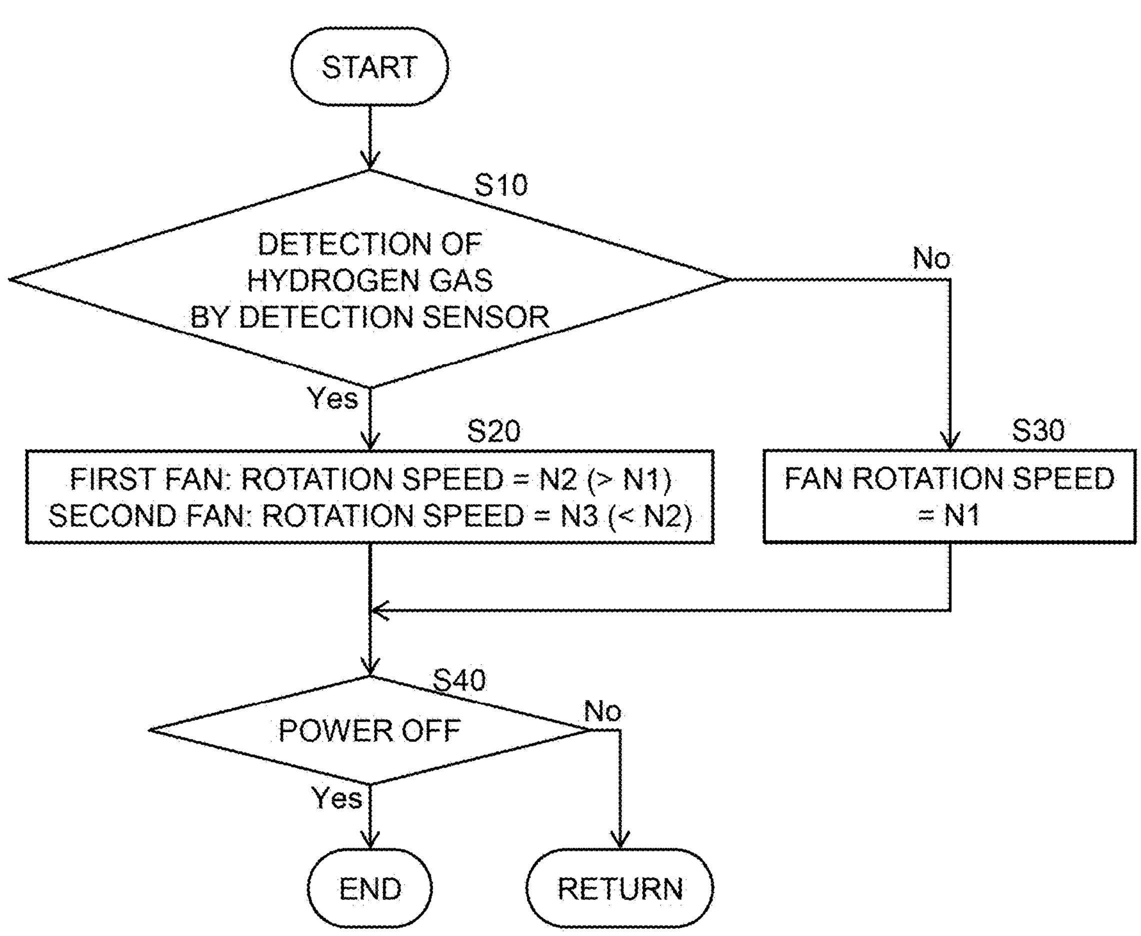

[FIG.11]
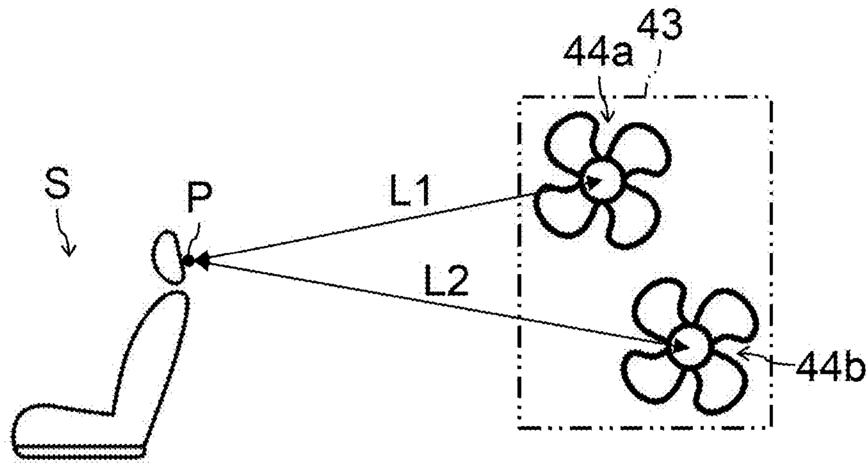

CONSTRUCTION MACHINE

TECHNICAL FIELD

The present invention relates to a construction machine equipped with a fuel cell.

BACKGROUND ART

Hydrogen is expected as next-generation energy that does not emit carbon dioxide. A system that generates electricity or heat from the hydrogen and oxygen in air is the fuel cell.

However, in a case in which a machine on which a human rides is equipped with the fuel cell, it is difficult for the human to perceive hydrogen even when the hydrogen leaks, because hydrogen is colorless and odorless. To address this, Patent Document 1 discloses an automobile equipped with a hydrogen sensor for detecting the leakage of hydrogen.

In order to detect the leakage of hydrogen in an automobile equipped with a fuel cell, a fuel cell box that seals elements from which hydrogen possibly leaks, such as the fuel cell, has been required. In Patent Document 1, the fuel cell box is omitted by providing suction means that sucks an atmosphere gas from a predetermined space in which hydrogen possibly leaks, and disposing the hydrogen sensor on the windward side of the suction means. The hydrogen that has leaked in the predetermined space is sucked by the suction means and is discharged toward a storage battery that stores electricity generated by the fuel cell, to be used for cooling the storage battery.

PRIOR ART DOCUMENT

Patent Document

Patent Document 1: JP-2007-80655-A

SUMMARY OF THE INVENTION

Problem to be Solved by the Invention

In the case of the automobile like that in Patent Document 1, a travelling airflow is taken into the vehicle body and thus hydrogen in the vehicle body is easily discharged to the outside of the vehicle due to the travelling airflow. However, differently from the machine that executes movement travelling as main operation like the automobile, a construction machine such as a hydraulic excavator, which executes work such as excavation work in a certain area without moving much in many cases, requires a mechanism to actively discharge hydrogen in the machine body to the outside of the machine without relying on a travelling airflow or a natural wind.

An object of the present invention is to provide a construction machine that can actively discharge hydrogen around a fuel cell or a facility that accompanies the fuel cell to the outside of the machine.

Means for Solving the Problem

In order to achieve the above-described object, the present invention provides a construction machine including an electrically driven motor that serves as a power source, a fuel cell that generates power to be provided to the electrically driven motor, a hydrogen tank filled with a hydrogen gas to be supplied to the fuel cell, a hydraulic actuator driven by a hydraulic operating fluid delivered from a hydraulic pump, a heat exchanger that cools a cooling water that cools the electrically driven motor, a cooling water that cools the fuel cell, and the hydraulic operating fluid that drives the hydraulic actuator, a cooling fan that blows cooling air to the heat exchanger, and a fan controller that controls rotation of the cooling fan. In the construction machine, a hydrogen gas detection sensor is provided in a machine room in which the heat exchanger, the fuel cell, the cooling fan, and the hydrogen tank are disposed, the fuel cell is adjacent to the cooling fan, and the fan controller is configured to raise a rotation speed of the cooling fan when the hydrogen gas detection sensor has detected a hydrogen gas.

Advantages of the Invention

According to the present invention, even the construction machine for which it is difficult to take a travelling airflow into the inside of the machine body can actively discharge hydrogen around the fuel cell or the facility that accompanies the fuel cell to the outside of the machine.

BRIEF DESCRIPTION OF THE DRAWINGS

FIG. 1 is a side view of a hydraulic excavator that is one example of a construction machine according to a first embodiment of the present invention.

FIG. 2 is a schematic diagram depicting part of in-machine facilities housed in a machine room of the construction machine according to the first embodiment of the present invention, such that the part of the in-machine facilities is overlapped with a plan view of a swing structure.

FIG. 3 is a schematic diagram representing the major part of a fuel cell system included in the construction machine according to the first embodiment of the present invention.

FIG. 4 is a flowchart representing the procedure of control of a cooling fan by a fan controller included in the construction machine according to the first embodiment of the present invention.

FIG. 5 is a flowchart representing another example of the procedure of control of the cooling fan by the fan controller included in the construction machine according to the first embodiment of the present invention.

FIG. 6 is a flowchart representing the procedure of control of the cooling fan by the fan controller included in a construction machine according to a second embodiment of the present invention.

FIG. 7 is a flowchart representing the procedure of control of the cooling fan by the fan controller included in a construction machine according to a third embodiment of the present invention.

FIG. 8 is a diagram representing one example of display of a monitor included in the construction machine according to the third embodiment of the present invention.

FIG. 9 is a flowchart representing the procedure of control of the cooling fan by the fan controller included in a construction machine according to a fourth embodiment of the present invention.

FIG. 10 is a flowchart representing the procedure of control of the cooling fan by the fan controller included in a construction machine according to a fifth embodiment of the present invention.

FIG. 11 is a diagram for explaining a method for comparing the distances between an operation seat and the respective fans.

MODES FOR CARRYING OUT THE INVENTION

Embodiments of the present invention are described below with use of the drawings.

First Embodiment

Construction Machine

FIG. 1 is a side view of a hydraulic excavator that is one example of a construction machine according to a first embodiment of the present invention. In the present embodiment, a hydraulic excavator to which a bucket 23 is mounted as an attachment at the tip of a work device 20 (front work implement) is described as an example of the construction machine. However, the present invention can be applied also to a hydraulic excavator to which an attachment other than the bucket is mounted or other kinds of construction machines such as a wheel loader and a bulldozer. In the specification of the present application, the front side of a cab 16 (right side in FIG. 1) is defined as the front side of the hydraulic excavator (to be exact, swing structure 12).

The hydraulic excavator depicted in this diagram includes a machine body 10 and the work device 20. The machine body 10 includes a track structure 11 and the swing structure 12.

The track structure 11 includes left and right track devices 13 of a crawler type having continuous track crawlers in the present embodiment, and travels by the left and right track devices 13 being driven by left and right travelling motors 14, respectively. Hydraulic motors are used as the travelling motors 14.

The swing structure 12 is swingably disposed over the track structure 11 with the interposition of a swing device 15. A swing motor (not depicted) is included in the swing device 15 that joins the track structure 11 to the swing structure 12. The swing motor is driven and the swing structure 12 swings around a vertical center axis relative to the track structure 11. A hydraulic motor is used as the swing motor 34. The cab 16 in which an operator rides is disposed at a front portion (in the present embodiment, on the left side of the front portion) of the swing structure 12. A machine room 17 that houses a hydraulic pump 41 (FIG. 2) and the like is mounted on the rear side of the cab 16 in the swing structure 12. A counterweight 18 that maintains weight balance with the work device 20 is mounted at the rear end of the swing structure 12.

The work device 20 is an articulated work arm for executing work such as excavation of earth and sand, and is joined to a front portion of the swing structure 12 (in the present embodiment, on the right side of the cab 16). This work device 20 includes a boom 21, an arm 22, and the bucket 23. The boom 21 is joined to a base frame of the swing structure 12, which is referred to as a swing frame, by a pin, and pivots upward and downward relative to the swing structure 12 in association with extension and contraction of a boom cylinder 31. Both ends of the boom cylinder 31 are pivotally joined to the boom 21 and the swing structure 12. The arm 22 is joined to the tip of the boom 21 by a pin, and pivots forward and rearward relative to the boom 21 in association with extension and contraction of an arm cylinder 32. Both ends of the arm cylinder 32 are pivotally joined to the arm 22 and the boom 21. The bucket 23 is joined to the tip of the arm 22 by a pin, and pivots relative to the arm 22 in association with extension and contraction of a bucket cylinder 33. The base end of the bucket cylinder 33 is joined to the arm 22, and the tip thereof is joined to the bucket 23 with the interposition of a link. The boom cylinder 31, the arm cylinder 32, and the bucket cylinder 33 that drive the work device 20 are hydraulic actuators.

Machine Room

FIG. 2 is a schematic diagram depicting part of in-machine facilities housed in the machine room, such that the part of the in-machine facilities is overlapped with a plan view (diagram as viewed from the upper side) of the swing structure 12. An operation seat S at which an operator sits is disposed in the room of the cab 16. The machine room 17 defined by a bonnet is disposed between the cab 16 and the counterweight 18.

The machine room 17 houses part of a fuel cell system 40 including a fuel cell 45, pieces of equipment driven by the fuel cell 45, and pieces of equipment relating to operation of the fuel cell 45. Specifically, as elements configuring the fuel cell system 40, the hydraulic pump 41, an electrically driven motor 42, a heat exchanger (radiator) 43, a cooling fan 44, the fuel cell 45, and a hydrogen tank 46 are housed in the machine room 17. Here, the fuel cell 45 is adjacent to the cooling fan 44 in the left-right direction as depicted in FIG. 2. Further, in the example of FIG. 2, in the machine room 17, the elements are arranged in the left-right direction in order of the heat exchanger 43, the cooling fan 44, the fuel cell 45, the electrically driven motor 42, and the hydraulic pump 41 from the left. However, the arrangement of these pieces of equipment is changed according to need in some cases.

The hydraulic pump 41 takes in a hydraulic operating fluid from a hydraulic operating fluid tank (not depicted), and delivers it as a hydraulic fluid that drives the respective hydraulic actuators (boom cylinder 31 and the like) mounted to the hydraulic excavator.

The electrically driven motor 42 is a power source of the hydraulic excavator, and has an output shaft joined to a drive shaft of the hydraulic pump 41 and drives the hydraulic pump 41.

The heat exchanger 43 is a radiator that cools, by heat exchange with cooling air, liquids such as a cooling water for the electrically driven motor 42, the fuel cell 45, and the like and the hydraulic operating fluid that returns to the hydraulic operating fluid tank. That is, the heat exchanger 43 cools the cooling water that cools the electrically driven motor 42, the cooling water that cools the fuel cell 45, and the hydraulic operating fluid that drives each hydraulic actuator. The heat exchanger 43 can include a plurality of heat exchangers.

The cooling fan 44 is an air blowing device that blows cooling air to the heat exchanger 43. In the present embodiment, the cooling fan 44 is disposed between the heat exchanger 43 and the fuel cell 45. However, it is sufficient that the arrangement of the cooling fan 44 is arrangement that allows the heat exchanger 43 to be exposed to the flow of the cooling air induced by the cooling fan 44. Thus, the arrangement can be changed as appropriate. Further, the size and the quantity of the cooling fan 44 are set depending on the requested amount of cooling air. The number of cooling fans 44 may be one when one cooling fan 44 is sufficient. In the present embodiment, a configuration including a plurality of (in the example of FIG. 2, two) cooling fans (first cooling fan 44*a* and second cooling fan 44*b*) is depicted as an example.

The fuel cell 45 is a power generation device that converts the chemical energy of hydrogen and an oxidant (typically, oxygen) to electricity by an oxidation-reduction reaction, and generates power to be provided to various kinds of electrical equipment mounted to the hydraulic excavator, including the electrically driven motor 42 and the cooling fan 44. The power generated by the fuel cell 45 is provided to the electrical equipment as power or is stored in a battery (not depicted) mounted to the hydraulic excavator. The hydrogen tank 46 is filled with a hydrogen gas to be supplied to the fuel cell 45. The high-purity hydrogen gas with which the hydrogen tank 46 is filled is supplied to the fuel cell 45. Further, the hydraulic excavator is equipped with an air compressor (not depicted), and air around the hydraulic excavator is compressed by the air compressor to be supplied to the fuel cell 45. Oxygen included in the compressed air is used as the oxidant.

In the example of FIG. 2, arrangement in which the hydrogen tank 46 is located between the fuel cell 45 and the counterweight 18 is depicted as an example. However, the arrangement of the hydrogen tank 46 can also be changed according to need.

—Fuel Cell System—

FIG. 3 is a schematic diagram representing the major part of the fuel cell system 40. As depicted in FIG. 3, the hydraulic excavator of the present embodiment includes a light 25, a monitor 26, a hydrogen gas detection sensor 51, a fan controller 52, and a main controller 53.

The light 25 is an illumination device that illuminates the outside of the machine (surroundings of the hydraulic excavator) for the case of operating the hydraulic excavator at a dark place, or the like. The light 25 depicted in FIG. 1 as an example is a light that illuminates the front side of the swing structure 12, and is installed on the work implement 20 (boom 21) in the present embodiment. However, it is also possible to provide the light 25 on, for example, a front portion of the swing frame or the like. Moreover, although not depicted, a light that illuminates the rear side or a lateral side of the swing structure 12 is separately disposed in some cases.

The monitor 26 is a display device that displays support information, setting, and the like relating to operation of the hydraulic excavator, and is installed at such a position as to be easily viewed from the operation seat S in the room of the cab 16 (FIG. 2).

The hydrogen gas detection sensor 51 is a sensor that can detect a hydrogen gas. As the hydrogen gas detection sensor 51, sensors of various types generally known, such as a catalytic combustion type, a gas thermal conductivity type, and a semiconductor type, can be applied. The hydrogen gas detection sensor 51 is disposed in the machine room 17 together with the fuel cell 45, the hydrogen tank 46, a hydrogen gas pipe that connects the fuel cell 45 and the hydrogen tank 46, and the like, and detects a hydrogen gas in the machine room 17 (in the bonnet). An output of the hydrogen gas detection sensor 51 is input to the main controller 53. In the present embodiment, a configuration in which the hydrogen gas detection sensor 51 is connected to the fan controller 52 through the main controller 53 is depicted as an example. However, it is also possible to employ a configuration in which the hydrogen gas detection sensor 51 is directly connected to the fan controller 52 without the interposition of the main controller 53.

Although schematic representation is made in FIG. 3 regarding the arrangement of the hydrogen gas detection sensor 51, for example, the leeward side of the cooling fan 44 (downstream side in the flow direction of cooling air induced by the cooling fan 44 relative to this cooling fan 44) can be given as an example as a reasonable position in terms of detection of the hydrogen gas. Further, because the hydrogen gas is a gas lighter than air, it is more desirable to install the hydrogen gas detection sensor 51 at an upper part in the machine room 17 rather than at a lower part. The vicinity of a joint of the hydrogen gas pipe and the vicinity of an opening of the bonnet can also be given as preferable examples of the position at which the hydrogen gas detection sensor 51 is installed. It is also preferable to install a plurality of hydrogen gas detection sensors 51 at these places for improvement in the detection rate of the hydrogen gas. For example, there is a possibility that a hydrogen gas temporarily remains in the machine room 17 immediately after replacement of a component such as the hydrogen gas pipe due to maintenance or the like. A defect occurs in component attachment in the maintenance in some cases. In addition, there is also a possibility that a hydrogen gas enters the machine room 17 from the outside of the machine.

The fan controller 52 is a device (inverter, computer, or the like) that controls the rotation speed of the cooling fan 44, and controls the rotation speed of the cooling fan 44 on the basis of the output of the hydrogen gas detection sensor 51. In the present embodiment, the main controller 53 interposes between the hydrogen gas detection sensor 51 and the fan controller 52. Thus, the fan controller 52 controls the rotation speed of the cooling fan 44 in response to a signal input from the main controller 53 on the basis of the output of the hydrogen gas detection sensor 51. The fan controller 52 may be configured to be directly connected to the hydrogen gas detection sensor 51 without through the main controller 53 and control the rotation speed of the cooling fan 44 in response to an output (on/off of detection of a hydrogen gas) input from the hydrogen gas detection sensor 51 directly (or through an A/D converter according to need). Moreover, in a case in which both the fan controller 52 and the main controller 53 are configured by a computer, a configuration in which a single computer serves as both the fan controller 52 and the main controller 53 may be employed.

Specifically, the fan controller 52 raises the rotation speed of the cooling fan 44 when a hydrogen gas has been detected by the hydrogen gas detection sensor 51. In the present embodiment, the fan controller 52 is configured to cause speed increase of the rotation speed of the cooling fan 44 from a first rotation speed N1 to a second rotation speed N2 when a hydrogen gas has been detected by the hydrogen gas detection sensor 51.

The first rotation speed N1 is a value set in order to blow cooling air to the heat exchanger 43 during operation of the hydraulic excavator of the present embodiment. The first rotation speed N1 may be a constant value, or it is also possible to employ a variable value that changes depending on the temperature of the cooling target (a cooling water, a hydraulic operating fluid, or the like) sensed by a temperature sensor (not depicted). Further, when a plurality of fans (first cooling fan 44*a* and second cooling fan 44*b*) are included in the cooling fan 44 as in the present embodiment, in the case of setting in which part of the cooling fans (for example, first cooling fan 44*a*) is stopped with the purpose of blowing cooling air, the first rotation speed N1 of this part of the cooling fans is 0. That is, a rise in the rotation speed of the cooling fan from 0 to the second rotation speed N2 is also included in the concept of the "speed increase." It is obvious that the same applies also when the rotation speed rises to the second rotation speed N2 from the stopped state in a case in which the first rotation speed N1 is a variable value having 0 as the minimum value.

The second rotation speed N2 is a value set in order to discharge a hydrogen gas around the hydrogen gas pipe, the fuel cell 45, or the hydrogen tank 46 from the machine room 17, and is set to a value higher than the first rotation speed N1 (for example, maximum rotation speed of the cooling fan 44). Even when the first rotation speed N1 is a variable value that changes depending on the temperature of the cooling target, the second rotation speed N2 is set to a value higher than the maximum value of the first rotation speed N1.

The first cooling fan 44*a* and the second cooling fan 44*b* are included in the cooling fan 44. In the present embodiment, the first cooling fan 44*a* and the second cooling fan 44*b* are driven, with the rotation speeds thereof being always the same. However, a configuration may be employed in which they are driven at rotation speeds different from each other according to the required amount of cooling air.

The main controller 53 is electrically connected to pieces of in-machine electrical equipment, such as the hydrogen gas detection sensor 51, the fan controller 52, the light 25, and the monitor 26, and outputs a command signal to the fan controller 52 on the basis of the output of the hydrogen gas detection sensor 51. Specifically, when a hydrogen gas has been detected by the hydrogen gas detection sensor 51, the main controller 53 outputs, to the fan controller 52, a command signal to make a command to cause the cooling fan 44 to rotate at the second rotation speed N2. In contrast, when a hydrogen gas is not detected by the hydrogen gas detection sensor 51, the main controller 53 outputs, to the fan controller 52, a command signal to make a command to cause the cooling fan 44 to rotate at the first rotation speed N1. Therefore, in the present embodiment, the cooling fan 44 rotates at the second rotation speed N2 only while a hydrogen gas is detected by the hydrogen gas detection sensor 51. The cooling fan 44 rotates at the first rotation speed N1 when a hydrogen gas has not been detected or when a hydrogen gas has become undetected after the hydrogen gas has been once detected and speed increase control of the cooling fan 44 to the second rotation speed N2 has been executed.

—Cooling Fan Control—

FIG. 4 is a flowchart representing the procedure of control of the cooling fan 44 by the fan controller 52. As described above, the fan controller 52 raises the rotation speed of the cooling fan 44 from the first rotation speed N1 to the second rotation speed N2 when a hydrogen gas has been detected by the hydrogen gas detection sensor 51. While the power is on, the fan controller 52 repeatedly executes the control of FIG. 4 (cycle from "START" to "RETURN"). The flowchart depicted in this diagram as an example is based on the premise that the hydrogen gas detection sensor 51 is normally operating.

Upon powering on, the fan controller 52 starts the control of FIG. 4. First, in a step S10, the fan controller 52 determines whether a hydrogen gas is detected by the hydrogen gas detection sensor 51 on the basis of the output of the hydrogen gas detection sensor 51. When a hydrogen gas is not detected by the hydrogen gas detection sensor 51, the fan controller 52 moves the procedure from the step S10 to a step S30 to drive the cooling fan 44 at the first rotation speed N1. In contrast, when a hydrogen gas has been detected by the hydrogen gas detection sensor 51, the fan controller 52 moves the procedure from the step S10 to a step S20 to drive the cooling fan 44 at the second rotation speed N2. If the cooling fan 44 has been driven at the first rotation speed N1 until just before the detection (in the previous cycle), speed increase of the cooling fan 44 from the first rotation speed N1 to the second rotation speed N2 is made at this timing at which the hydrogen gas has been detected.

After the execution of the processing of the step S20 or S30, the fan controller 52 moves the procedure to a step S40 to determine whether the power has been turned off. When the power has been turned off, the fan controller 52 executes delay control and ends the control of FIG. 4. When the power-on state is continued, the fan controller 52 returns the procedure to the step S10.

By this repetitive control, the fan controller 52 continues to drive the cooling fan 44 at the first rotation speed N1 until a hydrogen gas is detected by the hydrogen gas detection sensor 51. Thereafter, when a hydrogen gas has been detected by the hydrogen gas detection sensor 51, the fan controller 52 causes speed increase of the rotation speed of the cooling fan 44 from the first rotation speed N1 to the second rotation speed N2. In the present embodiment, when the hydrogen gas has become undetected by the hydrogen gas detection sensor 51 as the result of driving of the cooling fan 44 at the second rotation speed N2, the fan controller 52 returns the rotation speed of the cooling fan 44 from the second rotation speed N2 to the first rotation speed N1.

In the flowchart of FIG. 4, the case has been exemplified in which the rotation speed of the cooling fan 44 is returned to the first rotation speed N1 when the hydrogen gas has become undetected after speed increase of the rotation speed of the cooling fan 44 to the second rotation speed N2 is caused. However, the configuration is not limited thereto. For example, it is also possible to configure the fan controller 52 such that, as depicted in FIG. 5, the cooling fan 44 is driven at the first rotation speed N1 at the start of control and, when speed increase of the rotation speed of the cooling fan 44 to the second rotation speed N2 is once caused, automatic return to the first rotation speed N1 is not permitted after that. Although not particularly depicted in the example of FIG. 5, the state in which the cooling fan 44 is driven at the second rotation speed N2 may be continued until the power is turned off or the power is depleted. It is also possible to stop the cooling fan 44 or decelerate the cooling fan 44 to the first rotation speed N1 by manually inputting an operation signal to the fan controller 52 through an operation device (not depicted). Even in these cases, the control of FIG. 5 is applied to subsequent operation of the cooling fan 44.

Effects

As described above, in the present embodiment, the hydrogen gas detection sensor 51 is installed in the machine room 17. In addition, the fan controller 52 is configured to be capable of controlling the cooling fan 44 that blows cooling air to the heat exchanger 43 according to the output of the hydrogen gas detection sensor 51. When a hydrogen gas has been detected by the hydrogen gas detection sensor 51, the fan controller 52 executes speed increase control of the rotation speed of the cooling fan 44 from the first rotation speed N1 for blowing the cooling air to the heat exchanger 43 to the second rotation speed N2 for discharging the hydrogen gas from the machine room 17. Due to this, even the construction machine for which it is difficult to take a travelling airflow into the inside of the machine body can actively discharge the hydrogen gas around the fuel cell 45 or the facility that accompanies the fuel cell 45 (hydrogen tank 46, hydrogen gas pipe, or the like) to the outside of the machine.

Second Embodiment

FIG. 6 is a flowchart representing the procedure of control of the cooling fan 44 by the fan controller 52 included in a construction machine according to a second embodiment of the present invention. Regarding processing that is the same as or corresponds to the flowchart of the first embodiment (FIG. 4), the same step number as FIG. 4 is used in FIG. 6 and description is omitted or simplified as appropriate. Similarly to the first embodiment, while the power is on, the fan controller 52 repeatedly executes the control of FIG. 6 (cycle from "START" to "RETURN"). The flowchart depicted in this diagram as an example is based on the premise that the hydrogen gas detection sensor 51 is normally operating, similarly to the first embodiment. Further, the present embodiment is similar to the first embodiment regarding the hardware configuration.

Also in the present embodiment, the fan controller 52 raises the rotation speed of the cooling fan 44 from the first rotation speed N1 to the second rotation speed N2 when a hydrogen gas has been detected by the hydrogen gas detection sensor 51. The present embodiment is different from the first embodiment in that, after raising the rotation speed of the cooling fan 44 to the second rotation speed N2, the fan controller 52 returns the rotation speed of the cooling fan 44 from the second rotation speed N2 to the first rotation speed N1 after a set time T1 set in advance from the timing at which the hydrogen gas detection sensor 51 has become the non-detection state of the hydrogen gas.

Upon powering on, the fan controller 52 starts the control of FIG. 6 to determine whether a hydrogen gas is detected (step S10). When a hydrogen gas is detected, the fan controller 52 moves the procedure from the step S10 to a step S11 to set a flag F to 1, and causes the cooling fan 44 to be driven at the second rotation speed N2 (step S20).

In contrast, when a hydrogen gas is not detected, the fan controller 52 moves the procedure from the step S10 to a step S12 to set the flag F to 0. At this time, in a case in which the setting of the flag F is switched from 1 to 0, the fan controller 52 records a clock time t of the switching in a memory. That is, in a case in which a hydrogen gas has been detected in the determination of the step S10 in the previous cycle (cycle previous by one cycle to the current cycle) and switching to the state in which the hydrogen gas is not detected is made in the determination of the step S10 in the current cycle, the clock time t of the switching is recorded in the memory.

After setting the flag F to 0, the fan controller 52 computes the time from the clock time t to the current timing, that is, a continuation time T of the state in which the hydrogen gas is not detected until the current clock time, and determines whether the continuation time T is equal to or longer than the set time T1 (step S13). When T≥T1, that is, the set time T1 has elapsed from the clock time t at which the hydrogen gas detection sensor 51 has become the non-detection state of the hydrogen gas, the fan controller 52 causes the cooling fan 44 to be driven at the first rotation speed N1 (step S30). In contrast, when T<T1, that is, the set time T1 has not elapsed from the clock time t at which the hydrogen gas detection sensor 51 has become the non-detection state of the hydrogen gas, the fan controller 52 causes the cooling fan 44 to be driven at the second rotation speed N2 (step S20). In the control of FIG. 6, the procedure after the step S20 or the step S30 is the same as that of the first embodiment (FIG. 4).

Also in the present embodiment, speed increase control of the cooling fan 44 is executed when a hydrogen gas has been detected. Thus, effects similar to those of the first embodiment are obtained.

Further, as described above, in the present embodiment, if the cooling fan 44 is once driven at the second rotation speed N2, even when the hydrogen gas has become undetected after that, the cooling fan 44 continues to be driven at the second rotation speed N2 for the set time T1 in the state in which the hydrogen gas is not detected. After driving the cooling fan 44 at the second rotation speed N2 for the set time T1 in the state in which the hydrogen gas is not detected, the fan controller 52 returns the rotation speed of the cooling fan 44 from the second rotation speed N2 to the first rotation speed N1. Therefore, the remaining of the hydrogen gas in the machine room 17 can be suppressed more effectively.

Third Embodiment

FIG. 7 is a flowchart representing the procedure of control of the cooling fan 44 by the fan controller 52 included in a construction machine according to a third embodiment of the present invention. Regarding processing that is the same as or corresponds to the flowchart of the first embodiment (FIG. 4), the same step number as FIG. 4 is used in FIG. 7 and description is omitted or simplified as appropriate. Similarly to the first embodiment, while the power is on, the fan controller 52 repeatedly executes the control of FIG. 7 (cycle from "START" to "RETURN"). The flowchart depicted in this diagram as an example is based on the premise that the hydrogen gas detection sensor 51 is normally operating, similarly to the first embodiment. Further, the present embodiment is similar to the first embodiment regarding the hardware configuration.

Figure 8:
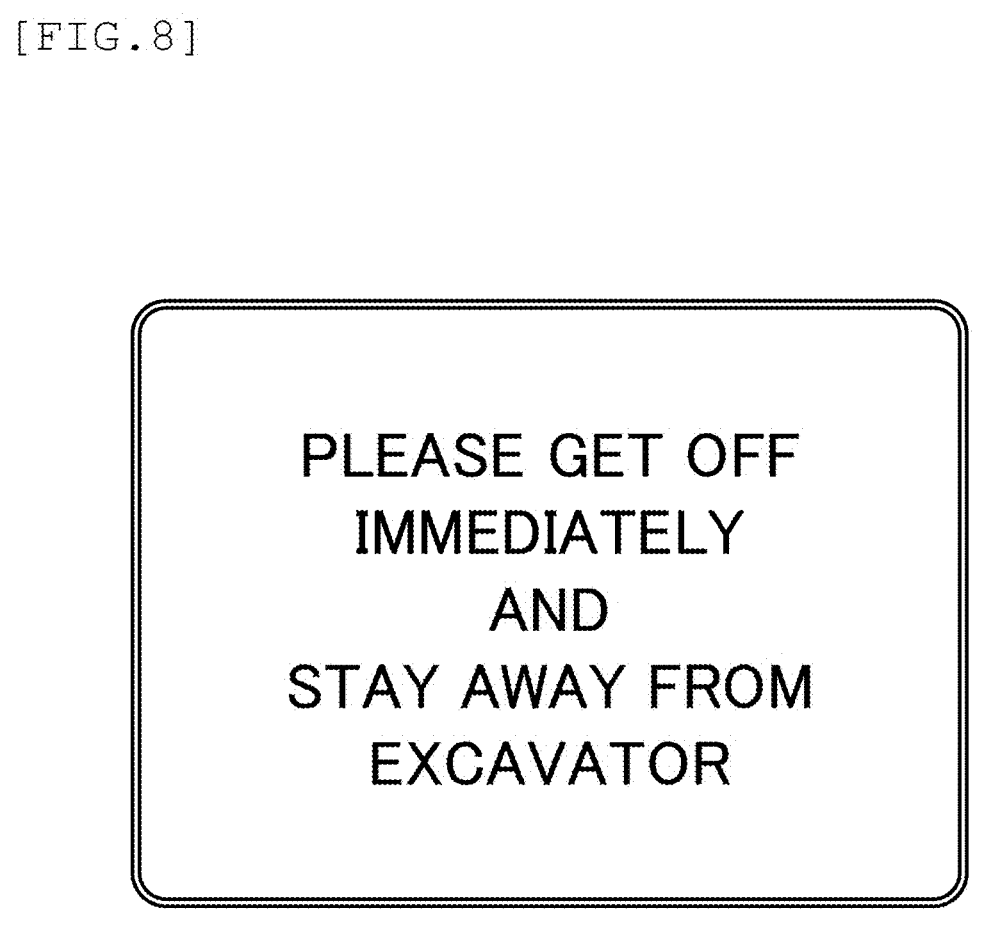

Also in the present embodiment, the fan controller 52 raises the rotation speed of the cooling fan 44 from the first rotation speed N1 to the second rotation speed N2 when a hydrogen gas has been detected by the hydrogen gas detection sensor 51. The present embodiment is different from the first embodiment in that the main controller 53 has a function of controlling display on the monitor 26 on the basis of the output of the hydrogen gas detection sensor 51 and, when a hydrogen gas has been detected by the hydrogen gas detection sensor 51, the main controller 53 causes the monitor 26 to display an indication (FIG. 8) that prompts the person who rides in the cab 16 to get off the machine.

Upon powering on, the fan controller 52 starts the control of FIG. 7 to drive the cooling fan 44 at the first rotation speed N1 or the second rotation speed N2 depending on whether a hydrogen gas is detected similarly to the first embodiment (FIG. 4) (steps S10 to S30). On that occasion, in the present embodiment, when a hydrogen gas has been detected, the fan controller 52 causes the cooling fan 44 to be driven at the second rotation speed N2, and causes the monitor 26 to display a warning indication like one illustrated in FIG. 8 as one example (step S21) to move the procedure to the step S40. The order of execution of the steps S20 and S21 may be reversed, or the steps S20 and S21 may be simultaneously executed. In FIG. 8, as the indication displayed by the monitor 26 in the step S21, a message such as "Please get off immediately and stay away from excavator" is depicted as an example. In the control of FIG. 7, the procedures after the step S40 are the same as that of the first embodiment (FIG. 4).

The control of the present embodiment exemplified in FIG. 7 is equal to control obtained by addition of the processing of the warning indication (step S21) in association with the processing of the step S20 in the flowchart of FIG. 4 in the first embodiment. The processing of the warning indication (step S21) can be executed in association with the step S20 also in the control represented by the flowchart of FIG. 5 or FIG. 6.

Also in the present embodiment, speed increase control of the cooling fan 44 is executed when a hydrogen gas has been detected. Thus, effects similar to those of the first embodiment are obtained.

Moreover, as described above, in the present embodiment, when a hydrogen gas has been detected, the indication like that depicted in FIG. 8 as an example is displayed on the monitor 26 in addition to the speed increase control of the cooling fan 44. This can prompt the person who rides in the cab 16 to actively get off the machine.

Fourth Embodiment

FIG. 9 is a flowchart representing the procedure of control of the cooling fan 44 by the fan controller 52 included in a construction machine according to a fourth embodiment of the present invention. Regarding processing that is the same as or corresponds to the flowchart of the first embodiment (FIG. 4), the same step number as FIG. 4 is used in FIG. 9 and description is omitted or simplified as appropriate. Similarly to the first embodiment, while the power is on, the fan controller 52 repeatedly executes the control of FIG. 9 (cycle from "START" to "RETURN"). The flowchart depicted in this diagram as an example is based on the premise that the hydrogen gas detection sensor 51 is normally operating, similarly to the first embodiment. Further, the present embodiment is similar to the first embodiment regarding the hardware configuration.

Also in the present embodiment, the fan controller 52 raises the rotation speed of the cooling fan 44 from the first rotation speed N1 to the second rotation speed N2 when a hydrogen gas has been detected by the hydrogen gas detection sensor 51. The present embodiment is different from the first embodiment in that the main controller 53 has a function of controlling power provision to pieces of in-machine electrically driven equipment including the electrically driven motor 42, the cooling fan 44, and the light 25 on the basis of the output of the hydrogen gas detection sensor 51 and, when a hydrogen gas has been detected by the hydrogen gas detection sensor 51, the main controller 53 stops the power provision to the pieces of in-machine electrically driven equipment excluding the cooling fan 44 and provides power to only the cooling fan 44. The in-machine electrically driven equipment typically means equipment having a main purpose of converting electrical energy to mechanical work, heat, or light among the pieces of electrical equipment mounted in the hydraulic excavator, and pieces of electrical equipment in the sensing system and the computation and control system, such as sensors and computers, are excluded therefrom.

Further, in the present embodiment, a description is given of a case in which power is provided to only the cooling fan 44 when a hydrogen gas has been detected. However, it is also possible to employ a configuration in which the power provision to the pieces of in-machine electrically driven equipment excluding the cooling fan 44 and the light 25 is stopped and power is provided to only the cooling fan 44 and the light 25.

Upon powering on, the fan controller 52 starts the control of FIG. 9 to drive the cooling fan 44 at the first rotation speed N1 or the second rotation speed N2 depending on whether a hydrogen gas is detected similarly to the first embodiment (FIG. 4) (steps S10 to S30). On that occasion, in the present embodiment, when a hydrogen gas has been detected, the fan controller 52 causes the cooling fan 44 to be driven at the second rotation speed N2, and interrupts provision of power to the pieces of in-machine electrically driven equipment (electrically driven motor 42 and the like) excluding the cooling fan 44 (step S22) to move the procedure to the step S40. The order of execution of the steps S20 and S22 may be reversed, or the steps S20 and S22 may be simultaneously executed. As described above, the power provision to the light 25 may be continued. In the control of FIG. 9, the procedures after the step S40 are the same as that of the first embodiment (FIG. 4).

The control of the present embodiment exemplified in FIG. 9 is equal to control obtained by addition of the processing of the warning indication (step S21) in association with the processing of the step S20 in the flowchart of FIG. 4 in the first embodiment. The processing of the power provision limitation (step S22) can be executed in association with the step S20 also in the control represented by the flowchart of FIG. 5, FIG. 6, or FIG. 7.

Also in the present embodiment, speed increase control of the cooling fan 44 is executed when a hydrogen gas has been detected. Thus, effects similar to those of the first embodiment are obtained.

Further, as described above, in the present embodiment, when a hydrogen gas has been detected, the occurrence of insufficiency of the power provided to the cooling fan 44 (or the cooling fan 44 and the light 25) can be suppressed by providing power to only the cooling fan 44 (or the cooling fan 44 and the light 25). By ensuring the power provided to the cooling fan 44, the performance of continuous discharge of the hydrogen gas from the machine room 17 can be ensured. Moreover, by ensuring the power provided to the light 25, the surroundings of the hydraulic excavator can be illuminated by the light 25 and the movement of the operator who has gotten off the machine can be assisted in the case of operating the hydraulic excavator at a dark place or at night.

Fifth Embodiment

FIG. 10 is a flowchart representing the procedure of control of the cooling fan 44 by the fan controller 52 included in a construction machine according to a fifth embodiment of the present invention. Regarding processing that is the same as or corresponds to the flowchart of the first embodiment (FIG. 4), the same step number as FIG. 4 is used in FIG. 10 and description is omitted or simplified as appropriate. Similarly to the first embodiment, while the power is on, the fan controller 52 repeatedly executes the control of FIG. 10 (cycle from "START" to "RETURN"). The flowchart depicted in this diagram as an example is based on the premise that the hydrogen gas detection sensor 51 is normally operating, similarly to the first embodiment. Further, the present embodiment is similar to the first embodiment regarding the hardware configuration.

Also in the present embodiment, the fan controller 52 raises the rotation speed of the cooling fan 44 from the first rotation speed N1 to the second rotation speed N2 when a hydrogen gas has been detected by the hydrogen gas detection sensor 51. The present embodiment is different from the first embodiment in that a difference is made between the rotation speeds of the first cooling fan 44*a* and the second cooling fan 44*b* included in the cooling fan 44. Specifically, when a hydrogen gas has been detected by the hydrogen gas detection sensor 51, the fan controller 52 raises the rotation speed of the first cooling fan 44*a* whose distance from the operation seat S is relatively short to the second rotation speed N2, and causes the second cooling fan 44*b* to be driven at a third rotation speed N3 lower than the second rotation speed N2. It is sufficient that the third rotation speed N3 is a rotation speed lower than the second rotation speed N2. For example, it is also possible to set the third rotation speed N3 to the same value as the first rotation speed N1, and it is also possible to set the third rotation speed N3 to 0 (stop) (note that negative values (that is, reverse rotation) are excluded).

Upon powering on, the fan controller 52 starts the control of FIG. 10 to control the rotation speed of the cooling fan 44 depending on whether a hydrogen gas is detected similarly to the first embodiment (FIG. 4) (steps S10 to S30), and moves the procedure to the step S40. In the present embodiment, when a hydrogen gas has been detected, in the step S20, the fan controller 52 causes the first cooling fan 44*a* relatively close to the operation seat S to be driven at the second rotation speed N2 and causes the second cooling fan 44*b* relatively remote from the operation seat S to be driven at the third rotation speed N3 (<N2). In the control of FIG. 10, the procedures after the step S40 are the same as that of the first embodiment (FIG. 4).

The control of the present embodiment exemplified in FIG. 10 is equal to control obtained by applying the individual control of the fans to the processing of the step S20 in the flowchart of FIG. 4 in the first embodiment. The individual control of the fans can be applied to the step S20 in the control represented by the flowchart of FIG. 5, FIG. 6, FIG. 7, or FIG. 9.

Here, FIG. 11 is a diagram for explaining a method of comparing the distances between the operation seat S and the respective fans. FIG. 11 corresponds to a diagram obtained when the hydraulic excavator is viewed from the left side of the swing structure 12. In a case in which a plurality of fans are included in the cooling fan 44, the layout of these fans possibly differs depending on the machine model or the like. Although a case in which the cooling fans are arranged in the front-rear direction is depicted in FIG. 11 as an example, possibly they are arranged in the left-right direction in some cases. In either case, the distances between the respective fans and the operation seat S are compared on the basis of, for example, each distance L from a reference point P on the operation seat S to the rotation center of each fan. The reference point P can be set at any position with respect to the operation seat S. In FIG. 11, an example in which the reference point P is set at a specific position on a headrest is depicted. In the example depicted in FIG. 11, a distance L1 between the first cooling fan 44*a* and the operation seat S is shorter than a distance L2 between the second cooling fan 44*b* and the operation seat S. Thus, the fan relatively close to the operation seat S is the first cooling fan 44*a*.

In a case in which the positions of the first cooling fan 44*a* and the second cooling fan 44*b* are different in the height direction as depicted in FIG. 11, it is also possible that the second cooling fan 44*b* has a shorter absolute distance in the three-dimensional space even when the distance from the operation seat S in the horizontal direction is relatively short for the first cooling fan 44*a* (that is, the first cooling fan 44*a* is apparently closer in a plan view). In such a case, in the present embodiment, the second cooling fan 44*b* is regarded as the fan closest to the operation seat S, and speed increase of the second cooling fan 44*b* to the second rotation speed N2 is caused when a hydrogen gas has been detected.

Moreover, in a case in which the cooling fan 44 includes three or more cooling fans, when a hydrogen gas has been detected, the cooling fan closest to the operation seat S is driven at the second rotation speed and the remaining cooling fans are driven at a rotation speed equal to or lower than the second rotation speed N2. The remaining cooling fans may be driven at the third rotation speed uniformly. Alternatively, a difference in the rotation speed may be made between the remaining cooling fans such that, for example, the rotation speed of the cooling fan remoter from the operation seat S is set lower. Further, one fan or part of the fans closest to the operation seat S among the remaining cooling fans may be driven at the second rotation speed N2 as with the cooling fan closest to the operation seat S among all cooling fans.

Also in the present embodiment, speed increase control of the cooling fan 44 is executed when a hydrogen gas has been detected. Thus, effects similar to those of the first embodiment are obtained.

Moreover, as described above, in the present embodiment, the first cooling fan 44*a* closer to the operation seat S is driven at a rotation speed (second rotation speed N2) higher than the rotation speed of the other second cooling fan 44*b*. Due to this, when a hydrogen gas has been detected in the machine room 17, the hydrogen gas near the operation seat S is preferentially discharged. This can actively discharge the hydrogen gas from the machine room 17 while keeping the existence area of the hydrogen gas away from the operation seat S.

DESCRIPTION OF REFERENCE CHARACTERS

10: Machine body
16: Cab
17: Machine room
20: Work device
25: Light
26: Monitor
31: Boom cylinder (hydraulic actuator)
32: Arm cylinder (hydraulic actuator)
33: Bucket cylinder (hydraulic actuator)
41: Hydraulic pump
42: Electrically driven motor
43: Heat exchanger
44: Cooling fan
44*a*: First cooling fan
44*b*: Second cooling fan
45: Fuel cell
51: Hydrogen gas detection sensor
52: Fan controller
53: Main controller (controller)
N1: First rotation speed
N2: Second rotation speed
T1: Set time
S: Operation seat

The invention claimed is:

1. A construction machine comprising:
an electrically driven motor that serves as a power source;
a fuel cell that generates power to be provided to the electrically driven motor;
a hydrogen tank filled with a hydrogen gas to be supplied to the fuel cell;
a hydraulic actuator driven by a hydraulic operating fluid delivered from a hydraulic pump;
a heat exchanger that cools a cooling water that cools the electrically driven motor, a cooling water that cools the fuel cell, and the hydraulic operating fluid that drives the hydraulic actuator;
a cooling fan that blows cooling air to the heat exchanger; and
a fan controller that controls rotation of the cooling fan, wherein a hydrogen gas detection sensor is provided in a machine room in which the heat exchanger, the fuel cell, the cooling fan, and the hydrogen tank are disposed, the fuel cell is adjacent to the cooling fan, and the fan controller is configured to raise a rotation speed of the cooling fan when the hydrogen gas detection sensor has detected a hydrogen gas.

2. The construction machine according to claim 1, wherein the fan controller is configured to raise a rotation speed of the cooling fan from a first rotation speed to a second rotation speed set higher than the first rotation speed, when the hydrogen gas detection sensor has detected a hydrogen gas.

3. The construction machine according to claim 2, wherein the fan controller is configured to, after raising a rotation speed of the cooling fan to the second rotation speed, return the rotation speed of the cooling fan from the second rotation speed to the first rotation speed after a set time that is set in advance from a timing at which the hydrogen gas detection sensor has become a non-detection state of a hydrogen gas.

4. The construction machine according to claim 1, further comprising:

a cab;

a monitor disposed in the cab; and a controller that controls display on the monitor, wherein the controller is configured to cause the monitor to display an indication that prompts a person to get off the construction machine, when a hydrogen gas has been detected by the hydrogen gas detection sensor.

5. The construction machine according to claim 1, wherein the construction machine includes a controller that controls power provision to pieces of in-machine electrically driven equipment including the electrically driven motor and the cooling fan, and the controller is configured to stop the power provision to the pieces of in-machine electrically driven equipment excluding the cooling fan when a hydrogen gas has been detected by the hydrogen gas detection sensor.

6. The construction machine according to claim 1, wherein the construction machine includes a light that illuminates outside of the construction machine, and a controller that controls power provision to pieces of in-machine electrically driven equipment including the electrically driven motor, the cooling fan, and the light, and the controller is configured to stop the power provision to the pieces of in-machine electrically driven equipment excluding the cooling fan and the light when a hydrogen gas has been detected by the hydrogen gas detection sensor.

7. The construction machine according to claim 2, further comprising:

a cab, wherein the cooling fan that blows cooling air to the heat exchanger that cools the cooling water that cools the electrically driven motor, the cooling water that cools the fuel cell, and the hydraulic operating fluid that drives the hydraulic actuator has a first cooling fan and a second cooling fan remoter from the cab relative to the first cooling fan, and the fan controller is configured to raise a rotation speed of the first cooling fan to the second rotation speed and set a rotation speed of the second cooling fan to be lower than the second rotation speed, when a hydrogen gas has been detected by the hydrogen gas detection sensor.

* * * * *